(12) United States Patent
    Kshetramade

(10) Patent No.: US 10,552,431 B2
(45) Date of Patent: Feb. 4, 2020

(54) PERSONALIZING SEARCH AND/OR RECOMMENDATION RESULTS BASED ON MEMBER ACTIVITY MODELS

(71) Applicant: Microsoft Technology Licensing, LLC, Redmond, WA (US)

(72) Inventor: Sanjay Kshetramade, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 15/721,420

(22) Filed: Sep. 29, 2017

(65) Prior Publication Data
US 2019/0102395 A1    Apr. 4, 2019

(51) Int. Cl.
*G06F 16/00*   (2019.01)
*G06F 16/2457* (2019.01)
*G06F 16/248*  (2019.01)
*G06F 16/9535* (2019.01)
*G06Q 50/00*   (2012.01)

(52) U.S. Cl.
CPC ...... *G06F 16/24578* (2019.01); *G06F 16/248* (2019.01); *G06F 16/9535* (2019.01); *G06Q 50/01* (2013.01)

(58) Field of Classification Search
CPC ........... G06F 16/24578; G06F 16/9535; G06F 16/248
USPC ....................................................... 707/728
See application file for complete search history.

(56) References Cited

U.S. PATENT DOCUMENTS

| | | | | |
|---|---|---|---|---|
| 7,167,910 | B2 * | 1/2007 | Farnham | G06F 3/0481 709/206 |
| 7,343,365 | B2 * | 3/2008 | Farnham | G06F 3/0481 707/737 |
| 2008/0275849 | A1 * | 11/2008 | Basu | G06Q 30/02 |
| 2009/0164929 | A1 * | 6/2009 | Chen | G06F 16/9535 715/769 |

(Continued)

OTHER PUBLICATIONS

Raad et al., "User profile matching in social metworks", HAL Id: hal-00643509, Dec. 17, 2011, 9 pages.*

(Continued)

*Primary Examiner* — Monica M Pyo
(74) *Attorney, Agent, or Firm* — Schwegman Lundberg & Woessner, P.A.

(57) ABSTRACT

Methods, systems, and computer programs are presented for analyzing profiles and building profile models that can be used to personalize search results for a member on a social network. In example embodiments, a system aggregates data about members on the social network including member profile data, customer relation data, and member communication data. The system further extracts attribute values from the aggregated data and maps the attribute values onto attribute vectors on a social data map. Based on the mapping, the system determines a model member profile for the member. The system further generates candidate attribute vectors for search results from a search for the member and determines a similarity score between the model member profile and each candidate attribute vector. The system further ranks the search results based on the similarity score and presents a ranked display of the search results to the user.

20 Claims, 9 Drawing Sheets

(56) References Cited

U.S. PATENT DOCUMENTS

| | | | | |
|---|---|---|---|---|
| 2010/0306249 | A1* | 12/2010 | Hill | G06Q 30/02 |
| | | | | 707/769 |
| 2012/0210240 | A1* | 8/2012 | Neystadt | G06Q 30/0282 |
| | | | | 715/739 |
| 2014/0324827 | A1* | 10/2014 | Hanses | G06F 16/38 |
| | | | | 707/722 |

OTHER PUBLICATIONS

Samen et al., "An Approach of Re-Ranking Search Results based on a Dynamic and Hybrid Modeling of User Profile", International Journal of Computer Applications, Jan. 2017, 8 pages.*

Xiao Han, "Mining user similarity in online social networks: analysis, modeling and applications", HAL Id: tel-01166748, Jun. 23, 2015, 143 pages.*

* cited by examiner

PERSONALIZING SEARCH AND/OR RECOMMENDATION RESULTS BASED ON MEMBER ACTIVITY MODELS

TECHNICAL FIELD

The subject matter disclosed herein generally relates to methods, systems, and computer programs for online searching and the personalizing of search and/or recommendation results.

BACKGROUND

Social networks allow members to connect with each other and share information. Some social networks allow members to engage in social selling over the network. Social selling is a method of a member developing connections over a social network with an aim to foster the connections into business relationships. For example, a member of a social network may make several connections with other members over the social network and later send inquiries to the other members for buying or selling products.

Activity over a social network can be tracked in order to gain insights regarding social selling activity. For example, one or more scores can be generated based on a member's social sale interactions with other members. Social sale interactions may include offering to sell products and offering to buy products and connecting with other members that buy and sell products. Additionally, a score may include contextual social gestures, such as "liking" a post, retweeting a post, following another member, and so forth. Based on these scores, a social network can gain insight to a sales sector that a member is affiliated with and a personal brand that the member is trying to build and market using social selling. For example, a member of a social network may use the social network to connect with other members (connections) and subsequently inquire whether the connections are interested in buying a product. Information can be collected not only about the contextual interactions that the member is using to engage the connections, but also the interactions of the connections on the social network, including responses to the member's interactions.

DESCRIPTION OF THE DRAWINGS

Some example embodiments are illustrated by way of example and not limitation in the figures of the accompanying drawings.

Like reference numerals refer to corresponding parts throughout the drawings.

DETAILED DESCRIPTION

Figure 1:
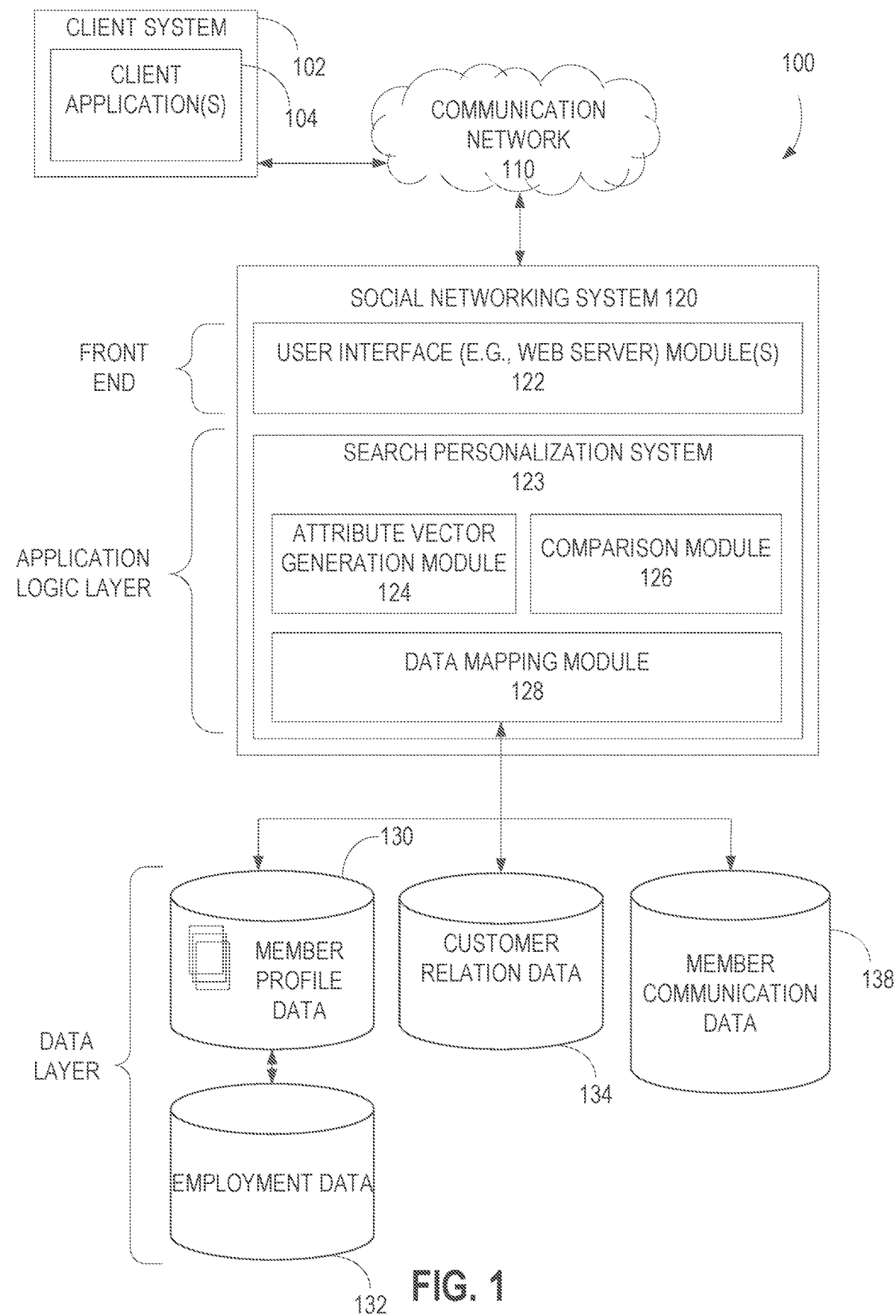
FIG. 1 is a network diagram depicting a client-server system that includes various functional components of a search personalization system, in accordance with some example embodiments.

The present disclosure describes methods, systems, and computer programs for analyzing profiles and building profile models that can be used to personalize search and/or recommendation results for a seller on a social selling platform, such as on a social networking service. In the following description, for purposes of explanation, numerous specific details are set forth to provide a thorough understanding of the various aspects of different example embodiments. However, it will be evident to one skilled in the art that any particular example embodiment may be practiced without all of the specific details and/or with variations, permutations, and combinations of the various features and elements described herein.

A technical challenge presented by the prior art is a lack of robust recommendations of members for a first member to engage in response to a search. For example, although a selling application may match a technical background of a buyer with a seller and determine that, due to the shared technical background, the buyer is more likely to buy a product from the seller than from another seller without a shared technical background, this inference is fairly one-dimensional and does not take into account other information such as the buyer's buying habits. A recommendation based purely on a buyer's member profile could also yield recommendations on buyers who are not active on the social network or do not typically use the social network for the purchasing function. In order to address challenges of prioritizing active buyers that are likely to buy from the seller and de-prioritize inactive or unresponsive buyers, embodiments shown herein describe a way in which the search tool can be improved by building a model search result based on data related to the seller or buyer and comparing the model search results with search results from a searching system. In example embodiments, the model search result is a model member profile that approximates a member profile of a purchaser with whom the first member will have a successful business relationship.

In embodiments presented herein, a social networking system aggregates data related to a member, generates a model search result for a first member using a mapped model of the data, uses a searching tool to generate a ranked list of search results, and alters the ranked list of search results to recommend search results to the member that are similar to the model search result. In example embodiments, the data aggregated includes member profile data of the first member and other members on the social network, customer relation data from transactions carried out by the first member and other members on the CRM systems, and data about the types of members that have communicated with the first member. Using this data, the system maps attribute values extracted from the data onto a social data map and builds an "ideal" member profile based on attributes that are correlated with successful sales.

The member profile data includes data received from a member profile that is associated with the seller. A member profile is represented by a set of attribute vectors, which are locations of approximate attribute values on a social data map. The attribute values are numerical inputs correlating to features of the member profile. In some embodiments, the features of the member profile include age, location, past job positions, technical field, and the like. Such information is typically collected by the social network when the member creates or updates his or her profile. In some embodiments, the member profile data is collected both from a member for which the social network is returning search results and from member profiles that may be the search results themselves.

The consumer relation data is data that is accrued as a part of customer relationship management (CRM) CRM involves aggregating customer relation data associated with sales, including completed sales, abandoned sales, the identity of the buyer in a sale, the identity of the seller in a sale, season of sales, marketing campaigns occurring during the sale, product reviews from the item sold, and the like. All of this data can be continuously collected, indexed (such as by date, location, currency, etc.), and stored as part of a CRM system.

The consumer relation data collected by a CRM system can be leveraged using analytical software to determine sales correlations and their strengths. Based on the data, analytical software can determine trends and similarities and use those to draw conclusions. For example, analytical software may determine that a coordinated marketing campaign for a product has failed to affect sales based on the customer relation data. Similarly, in example embodiments presented, the social networking system aggregates customer relation data and extracts attribute values from the data, with the attribute values being sales related to members of the social networking system. The attribute values extracted from the customer relation data are then mapped onto attribute vectors on the social data map.

The member communication data is data related to the direct communications between members of the social network. For example, it can be more advantageous for a first member to try to sell a product to another member that is likely to respond to communications from a first member rather than a member that never responds to such communications. Member communication data may include messages, chats, requests, and other communication interactions between the members of the social network. Attribute values are then extracted from the member communication data and mapped onto attribute vectors in the social data map.

After all attribute values from the various data sources have been mapped onto attribute vectors on the social data map, an ideal member profile is constructed out of selected attribute values to approximate the ideal member profile of a business partner for the first member. In example embodiments, a machine-learning program is used to determine similarities between mapped attribute vectors to determine a likelihood that the mapped attribute vector is part of the model member profile.

When the system receives a search request for a first member, the system transmits the search request to a searching system which searches an index of candidate search results In some example embodiments, the search tool selects candidate member profiles as search results for potential business partners for the first member, with the selection based on the query or based on other criteria. When the search tool returns a plurality of candidate search results, the system similarly calculates a candidate attribute vector based on features within the candidate search results. The system further compares the attribute vectors within the model search result with the respective candidate attribute vectors of candidate search result to determine a similarity score for each buyer. Finally, the system uses the similarity score as an additional feature in the machine learned model used to rank candidate search results.

Each member has an associated "ideal" member profile. It should be noted that the term "ideal" shall not be interpreted to mean that there is only one absolute "best" member profile and that a member profile need not be the "best" in order to be considered to be "ideal" In some example embodiments, the social networking system (e.g., the social networking system 120 in FIG. 1) creates a model search result for a particular member. A model search result represents the search results that the member prefers. The model search result is represented as an attribute vector. Thus, search results can be compared against the model search result to rank search results in an alternative mode.

The social networking system then converts each search result into a candidate search result comprised of attribute vectors, with the candidate member profile representing the member profile associated with the search result. In some example embodiments, the candidate search results are member profiles associated with particular members of the social networking system. In this example, the attributes vectors are locations of attribute values on a social data map, the attribute values associated with the member, such as location, age, work history, title, education, title, and so on. Thus, the attribute vectors represent the attributes of a member of the social networking system.

Once a search result is converted into a candidate search result, the social networking system calculates a distance score between the attribute vectors associated with the candidate search result and the attribute vectors associated with the ideal buyer profile. In some example embodiments, this calculation results in a score that represents the degree to which the search result matches the model search results for the particular member. In some example embodiments, the search results can be re-ordered based on these calculated scores.

In some example embodiments, the similarity between two attribute vectors (e.g., A and B) is calculated using a cosine similarity formula such as:

$$\text{similarity}(A, B) = \frac{\sum_{i=1}^{n} A_i B_i}{\sqrt{\sum_{i=1}^{n} A_i^2} \sqrt{\sum_{i=1}^{n} B_i^2}}$$

In this example, the cosine similarity will result in a score that ranges from −1 (exactly opposite) to 1 (exactly the same) with 0 representing no correlation. In some example embodiments, a threshold value is accessed and a search result is excluded if the cosine similarity score falls below the threshold value.

Once the search results have been re-ordered and/or re-ranked, the social networking system can combine the new ordering with the original ordering to produce a final search result ordering. The social networking system then transmits the candidate search results to the requesting member for presentation at the client device.

FIG. 1 is a network diagram depicting a client-server system environment 100 that includes various functional components of a social networking system 120, in accordance with some example embodiments. The client-server system environment 100 includes one or more client systems 102 and the social networking system 120. One or more communication networks 110 interconnect these components. The communication networks 110 may be any of a variety of network types, including local area networks (LANs), wide area networks (WANs), wireless networks, wired networks, the Internet, personal area networks (PANs), or a combination of such networks.

In some example embodiments, the client system 102 is an electronic device, such as a personal computer (PC), a laptop, a smartphone, a tablet, a mobile phone, or any other electronic device capable of communication with the communication network 110. The client system 102 includes one or more client applications 104, which are executed by the client system 102. In some example embodiments, the client application(s) 104 include one or more applications from a set consisting of search applications, communication applications, productivity applications, game applications, word processing applications, or any other useful applications. The client application(s) 104 include a web browser. The client system 102 uses a web browser to send and receive requests to and from the social networking system 120 and to display information received from the social networking system 120.

In some example embodiments, the client system 102 includes an application specifically customized for communication with the social networking system 120 (e.g., a LinkedIn iPhone application). In some example embodiments, the social networking system 120 is a server system that is associated with one or more services.

In some example embodiments, the client system 102 sends a search request to the social networking system 120. For example, a sales professional might search a social networking system 120 to identify members who could be prospective customers or clients. To do so, the member of the social networking system 120 uses the client system 102 to log into the social networking system 120 and submit a request with an accompanying search query that provides information on the type of member that the requesting member is interested in identifying. In response, the client system 102 receives the ranked list of search results corresponding to the transmitted search query and displays that ranked list of search results in a user interface on the client system 102.

In some example embodiments, as shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a social networking system 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the social networking system 120 is depicted in FIG. 1 as having a three-tiered architecture, the various example embodiments are by no means limited to this architecture.

As shown in FIG. 1, the front end consists of a user interface module(s) (e.g., a web server) 122, which receives requests from various client systems 102 and communicates appropriate responses to the requesting client systems 102. For example, the user interface module(s) 122 may receive requests in the form of Hypertext Transfer Protocol (HTTP) requests, or other web-based, application programming interface (API) requests. The client system 102 may be executing conventional web browser applications or applications that have been developed for a specific platform to include any of a wide variety of mobile devices and operating systems.

As shown in FIG. 1, the data layer includes several databases, including databases for storing data for various members of the social networking system 120, including member profile data 130, employment data 132, customer relation data 134, and member communication data 138, which is data stored in a particular type of database that uses graph structures with nodes, edges, and properties to represent and store data. Of course, in various alternative example embodiments, any number of other entities might be included in the social graph (e.g., companies, organizations, schools and universities, religious groups, non-profit organizations, governmental organizations, non-government organizations (NGOs), and any other group) and, as such, various other databases may be used to store data corresponding with other entities.

Consistent with some example embodiments, when a person initially registers to become a member of the social networking system 120, the person will be prompted to provide some personal information, such as his or her name, age (e.g., birth date), gender, contact information, home town, address, educational background (e.g., schools, majors, etc.), current job title, job description, industry, employment history, skills, professional organizations, memberships with other online service systems, and so on. This information is stored, for example, in the member profile data 130.

In some example embodiments, the member profile data 130 includes or is associated with member interaction data. In other example embodiments, the member interaction data is distinct from, but associated with, the member profile data 130. The member interaction data stores information detailing the various interactions each member has through the social networking system 120. In some example embodiments, interactions include posts, likes, messages, adding or removing social contacts, and adding or removing member content items (e.g., a message or like), while others are general interactions (e.g., posting a status update) and are not related to another particular member. Thus, if a given member interaction is directed towards or includes a specific member, that member is also included in the membership interaction record.

In some example embodiments, the member profile data 130 includes employment data 132. In other example embodiments, the employment data 132 is distinct from, but associated with, the member profile data 130. The employment data 132 stores information about the members' current and past employment, including work history, employer's title (e.g., company name), seniority, technical field, responsibilities, place in the organization hierarchy, a measure of a members influence in a field or network, and so on.

The customer relation data 134 stores data that results from the interaction of members as aggregated by CRM systems including, but not limited to, sales, account relationships, messages, profile views, profile saves, lead searches, and so on, related to one or more job listings. Thus, as sales personnel use a customer relation system to search for potential customers, the actions that the members take are stored in the customer relation data 134.

Once registered, a member may invite other members, or be invited by other members, to connect via the social networking system 120. A "connection" may include a bilateral agreement by the members, such that both members acknowledge the establishment of the connection. Similarly, in some example embodiments, a member may elect to "follow" another member. In contrast to establishing a "connection," the concept of "following" another member typically is a unilateral operation and, at least in some example embodiments, does not include acknowledgement or approval by the member that is being followed. When one member follows another, the member who is following may receive automatic notifications about various interactions undertaken by the member being followed. In addition to following another member, a member may elect to follow a company, a topic, a conversation, or some other entity, which may or may not be included in the social graph. Various other types of relationships may exist between different entities, and are also represented in the member communication data 138.

The social networking system 120 may provide a broad range of other applications and services that allow members the opportunity to share and receive information, often customized to the interests of the member. In some example embodiments, the social networking system 120 may include a photo sharing application that allows members to upload and share photos with other members. As such, at least in some example embodiments, a photograph may be a property or entity included within a social graph. In some example embodiments, members of the social networking system 120 may be able to self-organize into groups, or interest groups, organized around a subject matter or topic of interest. In some example embodiments, the data for a group may be stored in a database. When a member joins a group, his or her membership in the group will be reflected in the member profile data 130 and the member communication data 138.

In some example embodiments, the application logic layer includes a search personalization system 123 that includes various application server modules, which, in conjunction with the user interface module(s) 122, generate various user interfaces (e.g., web pages) with data retrieved from various data sources in the data layer. In some example embodiments, individual application server modules are used to implement the functionality associated with various applications, services, and features of the social networking system 120. For instance, a messaging application, such as an email application, an instant messaging application, or some hybrid or variation of the two, may be implemented with one or more application server modules. Similarly, a search engine enabling members to search for and browse member profiles may be implemented with one or more application server modules.

A data mapping module 128 is included in the application logic layer. The data mapping module 128 receives data about members on the social network from databases 130, 132, 134, and 138. One function of the data mapping module, in some embodiments, is to extract attributes from the data. For example, the data mapping module 228 may receive customer relation data indicating that a member has bought 56,894 units of a product in the last 12 months, or what buyers have purchased products from this member. The data mapping module 128 then extracts this indication as an attribute value.

After extracting the attributes, the data mapping module 128 then maps the attribute values onto a social data map comprised of attribute vectors. Each attribute value is matchable to an attribute vector. For example the attribute value "56,894 in 12 months" is matchable with the attribute vector "50,000+ in 1 year."

An attribute vector generation module 124 is further located in the application logic layer to determine an ideal result model comprised of model member profiles. Further, a comparison module 126 can also be included in the application logic layer. Of course, other applications or services that utilize the attribute vector generation module 124 and the comparison module 126 may be separately implemented in their own application server modules.

As illustrated in FIG. 1, in some example embodiments, the attribute vector generation module 124 and the comparison module 126 are implemented as services that operate in conjunction with various application server modules. For instance, any number of individual application server modules can invoke the functionality of the attribute vector generation module 124 and the comparison module 126. However, in various alternative example embodiments, the attribute vector generation module 124 and the comparison module 126 may be implemented as their own application server modules such that they operate as standalone applications.

Generally, the attribute vector generation module 124 uses member profile data to construct a model search result. In some example embodiments, the social networking system 120 uses computer learning to create a model based on member profile data. In some example embodiments, the model is created using deep learning or neural network learning methods. For example, the social networking system 120 has created a model that uses the data stored in a member profile as input to generate a model search result. The model search result is a series of numbers that represent the location (e.g., where location is based on the data in the member profile) of the member in a multi-dimensional vector space.

In a very simplified example, for a two dimensional space, with (x, y) values that range from 0 to 1, a model is trained to represent different areas in the 2-dimensional space with different types of member profiles (such that similar members are grouped together in the space). Each member could then be mapped to a specific (x, y) pair by the model. In general, the member profile will be mapped into a vector with hundreds of dimensions or values, such that very complicated member profiles and histories can be represented by the model.

In some example embodiments, the model uses the entire corpus of past interactions and member profile data to train a model that generates model search results.

In other example embodiments, a model is trained by determining correlations between profiles using a neural network. In this example, the neural network takes inputs (e.g., work history and member interaction data including the location, title, seniority, and so on). Each of these inputs is given a weight and passed to a plurality of hidden nodes. The hidden nodes exchange information, also given weights, to produce an output. In some example embodiments, there are several layers of hidden nodes. The output in this case is a multidimensional vector. For example, a first model search result would include a list of attribute vectors in afv1=(v1, v2, v3, v4 . . . vn).

In some example embodiments, the model is trained using existing data (e.g., member profiles that were mapped to attribute vectors and resulted in a successful predication or recommendation), and the neural network learning algorithm adaptively adjusts the weights to produce attribute vectors for member profiles that match existing records. In some example embodiments, when new transactions occur, the model is updated with the new data.

In some example embodiments, the comparison module 126 uses an attribute vector that is part of the model search result for a particular member to evaluate a list of potential search results for similarity and then re-orders the search results based on that comparison. In this way, each search result is compared to a model search result and moved up or down in the rankings In some example embodiments, the comparison module 126 uses cosine similarity analysis (as seen above) to determine the similarity between two attribute vectors.

Figure 2:
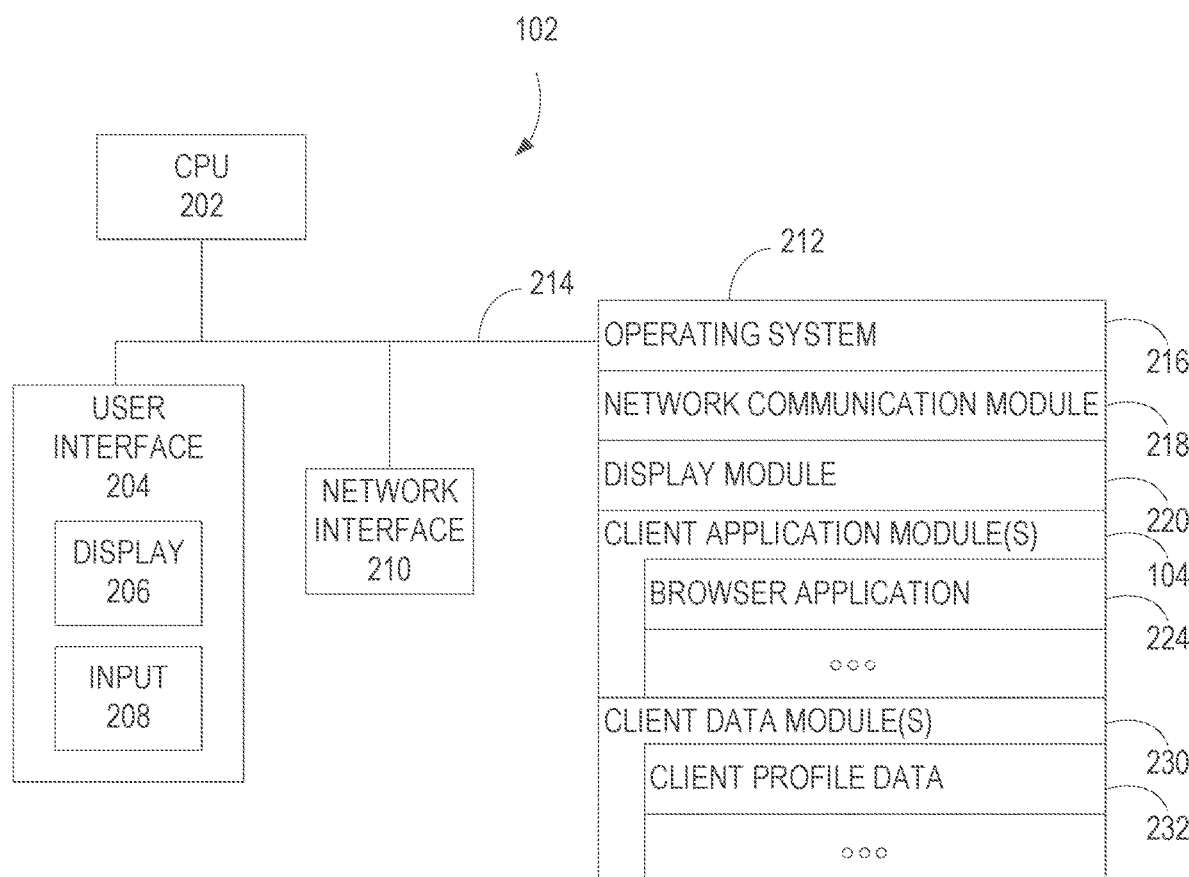
FIG. 2 is a block diagram illustrating a client system, in accordance with some example embodiments.

FIG. 2 is a block diagram further illustrating the client system 102, in accordance with some example embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means 208 such as a keyboard, a mouse, a touch sensitive display, or other input buttons. Furthermore, some client systems 102 use a microphone and voice recognition to supplement or replace the keyboard.

The memory 212 includes high-speed random-access memory, such as dynamic random-access memory (DRAM), static random-access memory (SRAM), double data rate random-access memory (DDR RAM), or other random-access solid state memory devices; and may include non-volatile memory, such as one or more magnetic disk storage devices, optical disk storage devices, flash memory devices, or other non-volatile solid state storage devices. The memory 212 may optionally include one or more storage devices remotely located from the CPU(s) 202. The memory 212, or alternatively, the non-volatile memory device(s) within the memory 212, comprise(s) a non-transitory computer-readable storage medium.

In some example embodiments, the memory 212, or the computer-readable storage medium of the memory 212, stores the following programs, modules, and data structures, or a subset thereof:

an operating system 216 that includes procedures for handling various basic system services and for performing hardware-dependent tasks;

a network communication module 218 that is used for connecting the client system 102 to other computers via the one or more network interfaces 210 (wired or wireless) and one or more communication networks 110, such as the Internet, other WANs, LANs, metropolitan area networks (MANs), etc.;

a display module 220 for enabling the information generated by the operating system 216 and client application(s) 104 to be presented visually on the display device 206;

one or more client application (s) 104 for handling various aspects of interacting with the social networking system (e.g., system 120 in FIG. 1), including but not limited to:

a browser application 224 for requesting information from the social networking system 120 (e.g., transmitting a search query) and receiving responses from the social networking system 120; and client data module(s) 230 for storing data relevant to clients, including but not limited to:

client profile data 232 for storing profile data related to a member of the social networking system 120 associated with the client system 102.

Figure 3:
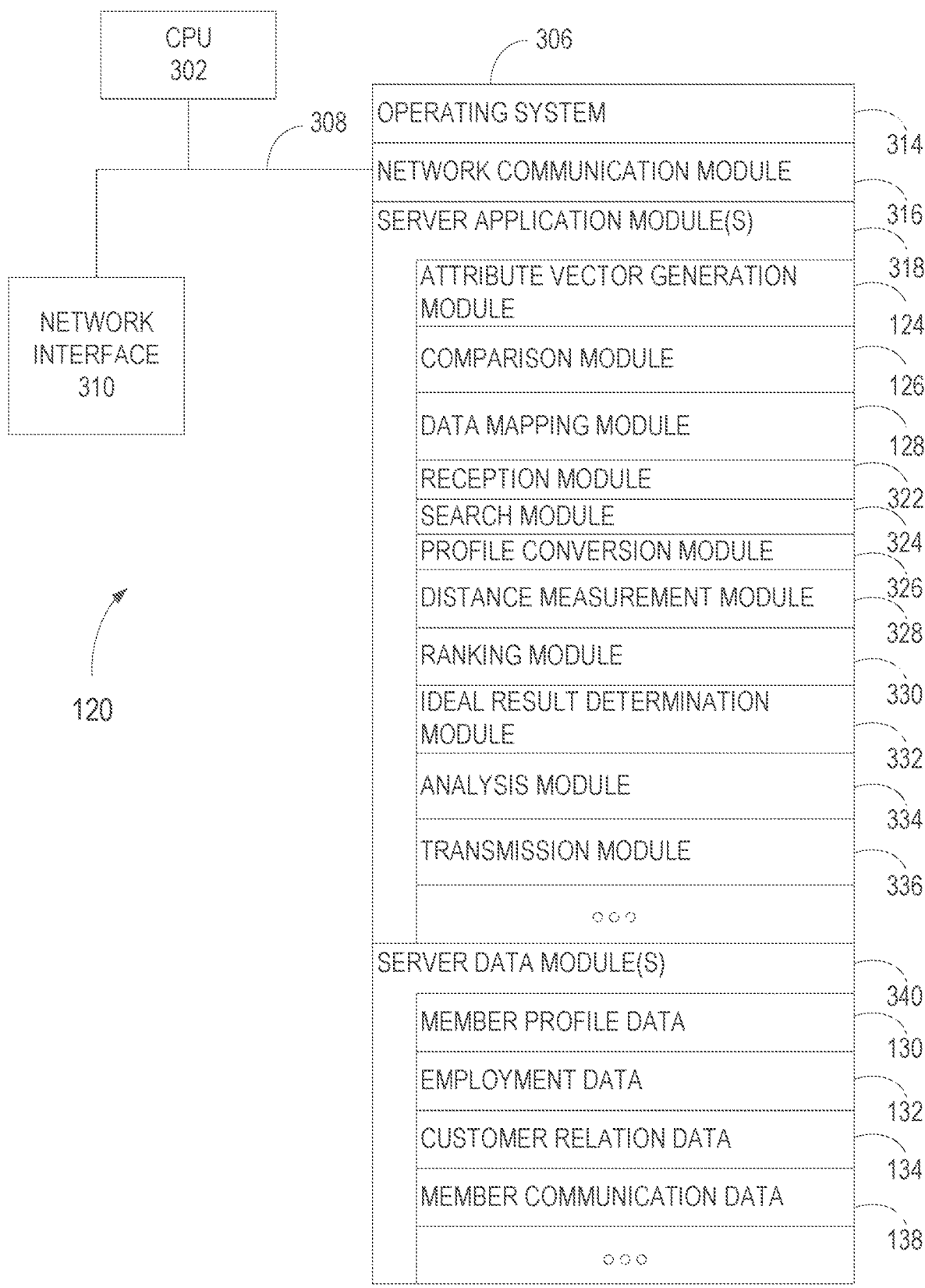
FIG. 3 is a block diagram illustrating a social networking system, in accordance with some example embodiments.

FIG. 3 is a block diagram further illustrating the social networking system 120, in accordance with some example embodiments. Thus, FIG. 3 is an example embodiment of the social networking system 120 in FIG. 1. The social networking system 120 typically includes one or more CPUs 302, one or more network interfaces 310, memory 306, and one or more communication buses 308 for interconnecting these components. The memory 306 includes high-speed random-access memory, such as DRAM, SRAM, DDR RAM, or other random-access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302.

The memory 306, or alternatively the non-volatile memory device(s) within the memory 306, comprises a non-transitory computer-readable storage medium. In some example embodiments, the memory 306, or the computer-readable storage medium of the memory 306, stores the following programs, modules, and data structures, or a subset thereof:

an operating system 314 that includes procedures for handling various basic system services and for performing hardware-dependent tasks;

a network communication module 316 that is used for connecting the social networking system 120 to other computers via the one or more network interfaces 310 (wired or wireless) and one or more communication networks 110, such as the Internet, other WANs, LANs, MANs, and so on;

one or more server application modules 318 for performing the services offered by the social networking system 120, including but not limited to:

a data mapping module 128 for receiving data from one or more of databases 130, 134, or 138, extracting attribute values from the data, and mapping the attribute values onto a social data map;

an attribute vector generation module 124 for using a search result (e.g., a member profile if the search is for members) to generate an attribute vector that represents the characteristics of the search result;

a comparison module 126 for comparing the attribute vector for a given search result (e.g., a member profile) with a model search result attribute vector (e.g., the type of member profile that a searching member would ideally like to find) to determine the degree to which a particular search result is similar to the model search result;

a reception module 322 for receiving a search query from a client system (e.g., the client system 102 in FIG. 1) associated with a particular member of the social networking system 120;

a search module 324 for searching using a received search result to generate a set of search results that are responsive to the search query;

a profile conversion module 326 for using a member profile to generate an attribute vector that represents the data in the member profile;

a distance measurement module 328 for determining the similarity of an attribute vector for a particular search result and the ideal attribute vector using a cosine similarity formula;

a ranking module 330 for ranking a set of search results based at least in part on the similarity of a particular search result to a model search result for a particular member;

an ideal result determination module 332 for generating an ideal result for a particular member based on the member's past interactions including the member's communications, profile views, lead saves, and so on;

an analysis module 334 for analyzing the interactions of the member through a customer relation management system; and a transmission module 336 for transmitting a selected skill or geographic location to a client system (e.g., the client system 102 in FIG. 1) for display, and server data module(s) 340, holding data related to the social networking system 120, including but not limited to:

member profile data 130, including both data provided by the member, who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, and seller preferences; and inferred member information based on the member's activity, member communication data 138, overall trend data for the social networking system 120, and so on;

employment data 132 including data representing a member's past work history, skills, seniority, title, responsibilities, place in a hierarchy, past purchases, and so on;

customer relation data 134 including data describing the actions of one or more sales personnel and the accompanying customer actions including communications, sales, views, and so on; and member communication data 138 including data that represents members of the social networking system 120 and the social connections between them.

Figure 4:
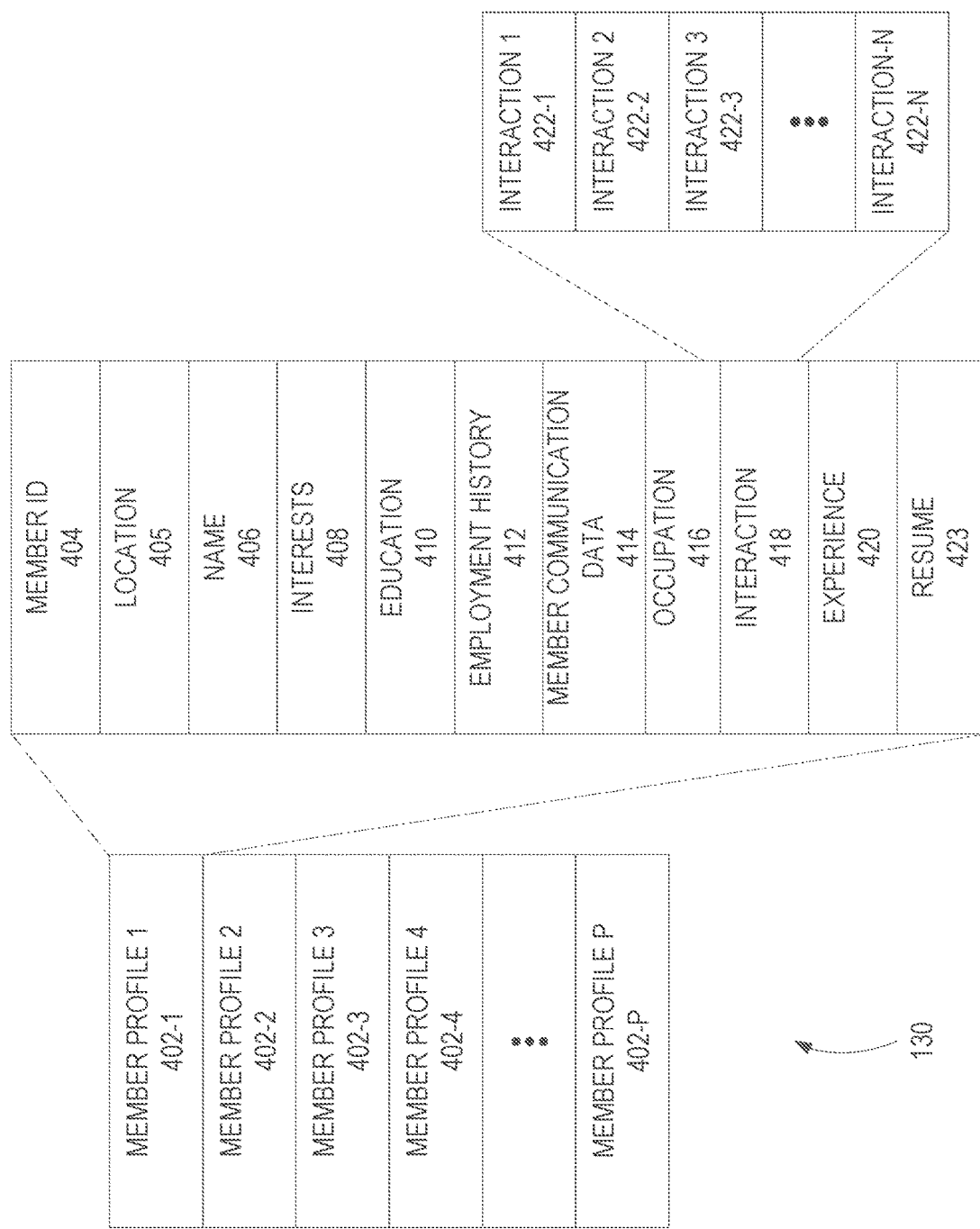
FIG. 4 is a block diagram of a data structure for member profile data for storing member profiles, in accordance with some example embodiments.

FIG. 4 is a block diagram of a data structure for a member profile data 130 for storing member profiles, in accordance with some example embodiments. In one embodiment, the member profile data 130 includes a plurality of member profiles 402-1 to 402-P, each of which corresponds to a member of the social networking system 120.

In some example embodiments, a respective member profile 402 stores a unique member ID 404 for the member profile 402, a location 405 associated with the member (e.g., the location that the member indicated was their location), a name 406 for the member (e.g., the member's legal name), member interests 408, member education history 410 (e.g., the high school and universities the member attended and the subjects studied, online courses or certifications, licenses, and so on), employment history 412 (e.g., member's past and present work history with job titles), member communication data 414 (e.g., a listing of the member's relationships as tracked by the social networking system 120), occupation 416, interaction 418, experience 420 (for listing experiences that do not fit under other categories, like community service or serving on the board of a professional organization), and a detailed member resume 423.

In some example embodiments, a member profile 402 includes a list of interactions (422-1 to 422-N). Each interaction 422 represents a particular action that a member takes through the social networking system (e.g., the social networking system 120 in FIG. 1) or a customer relationship management system that is integrated with the social networking system (e.g., the social networking system 120 in FIG. 1). Interactions include messages, responses, profile views, lead saves, sales, account connections, and so on.

Figure 5:
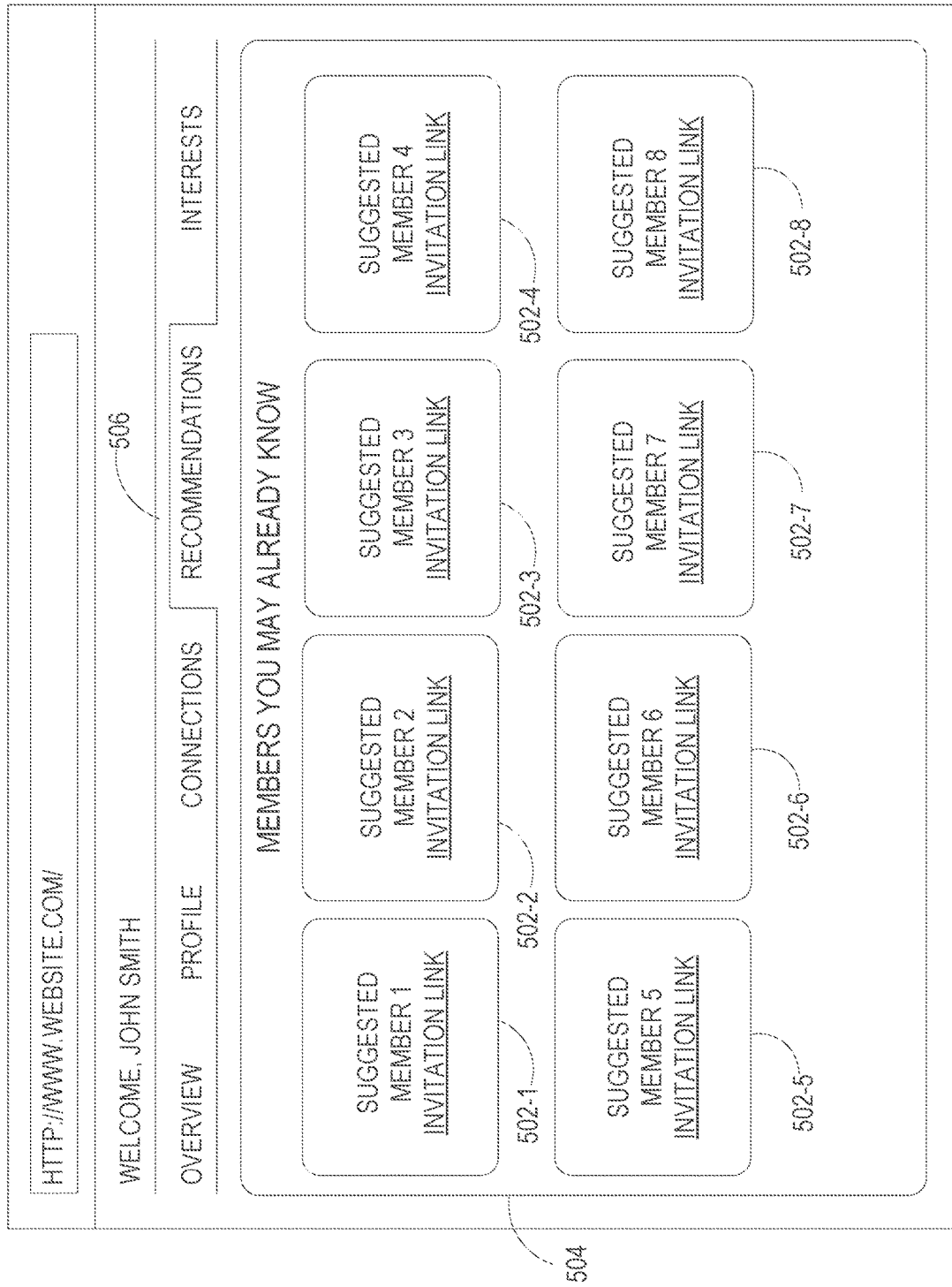
FIG. 5 is a user interface diagram illustrating an example of a user interface or web page that incorporates a list of members that a logged-in member may already know in a social networking system.

FIG. 5 is a user interface diagram illustrating an example of a user interface 500 or web page that incorporates a list of members that the logged-in member may already know in a social networking system (e.g., the social networking system 120 in FIG. 1). In the example user interface 500 of FIG. 5, the displayed user interface 500 represents a web page for a member of the social networking system (e.g., the social networking system 120 in FIG. 1) with the name John Smith.

As can be seen, a recommendations tab 506 has been selected, and a page of suggested members 504 that the logged-in member (e.g., John Smith) may know is displayed. The page of suggested members 504 is determined by matching a list of contacts received from the logged-in member with stored member profile information to identify current members who match the received contacts.

Each suggested member includes a selectable element, such as a selectable link (502-1 to 502-8), to send an invitation invite that suggested member to connect with the member to whom the page is presented. Similar links are included in guest recommendations.

Figure 6:
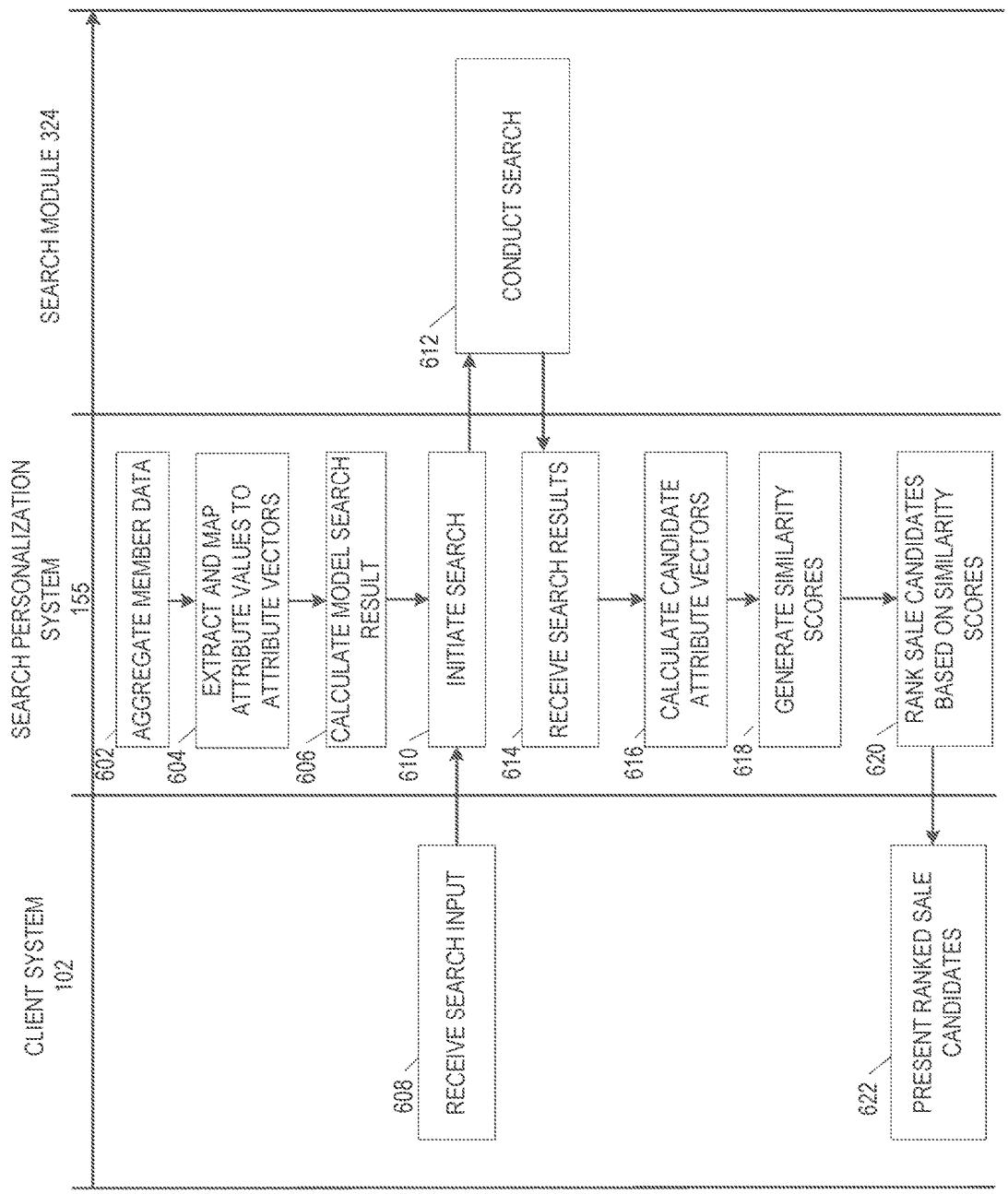
FIG. 6 further illustrates operations for building a model search result and re-ranking candidate search results returned by the searching system, according to some example embodiments.

FIG. 6 further illustrates operations for building a model search result and re-ranking candidate search results returned by the searching system, according to some example embodiments. At operation 602, member data from the various data sources, including consumer relation data 134, the member profile data 130, and the member communication data 138 are aggregated by the search personalization system 155.

At operation 604, the search personalization system extracts attribute values from the data and maps the values to attribute vectors. In some example embodiments, the extraction and mapping of attribute values involves pulling raw numbers associated with attributes in the data and applying the numbers (attribute values) to a social data map where the numbers are matchable with attribute vectors. In an example, the attribute values include attribute vector identifiers that match with attribute vectors associated and the actual value of the attribute correlates to a range of numbers that is also matchable with attribute vectors. Thus, the attribute value can be matched to the attribute vector that has a matching attribute for the identifier and a matching value range for the value. For example, if member communication data aggregated by the search personalization system 155 includes information that Microsoft employees have responded to the first member 14 times in the last 12 months, the attribute identifier "Microsoft" and the values "14 times" and "12 months" are matched to an attribute vector on the social data map that includes the attribute "Microsoft" and the range "10-15 times in the last year."

At operation 606, the search personalization system calculates a model search result based on the mapped attribute vectors. In some example embodiments, the model search result is represented by a single multi-dimensional vector based on the mapped attribute values. In one example where the model search result is a model member profile, the attribute vector uses term-frequency-inverse document frequency to generate the values used in the attribute vectors. This uses the frequency of an attribute in the model search result compared with how frequently that attributes appears in the total corpus of member profiles.

Thus the vector (V) can be represented as:

$$V=[w_1, w_2, w_3, \ldots w_n]$$

where the attribute vector (V) includes n different weights (w). In some example embodiments, each weight can be used to generate a weight for a given attribute (a) in a particular profile (p).

$$w_{a,p} = af_{a,p} \cdot \log \frac{|P|}{|\{p^1 \in P \mid a \in p^1\}|}$$

where the weight for a given attribute in a particular profile ($w_{a,p}$) is calculated by determining a frequency for a given attribute value in a particular profile ($af_{a,p}$). |P| is the total number of profiles in the whole corpus and p1 is the current document.

In some example embodiments, interactions with other members of the social networking system include the first member saving a member profile of another member of the social networking system. In some example embodiments, interactions with other members of the social networking system include the first member sending or receiving communication from another member of the social networking system. In some example embodiments, interactions with other members of the social networking system include the first member making a sales connection with another member of the social networking system.

At operation 608, a search result is received from a first member on the client system 102, such as from a mobile phone. In some example embodiments, the search request includes a search query and any additional information the first member chooses to send. In some example embodiments, the search request is a request to search for members of the social networking system (e.g., the social networking system 120 in FIG. 1) that match certain criteria.

At operation 610, the search personalization system 155 initiates a search based on a search query. In some example embodiments, the search is initiated by sending the search query to a searching system, such as the search module 324. At operation 612, the searching system conducts a search of potential search results. In an example, the searching system searches a member index to determine search results to a return to the first member, the search results comprising other members on the social network and the search in response to a search request for potential business partners for the first member.

At operation 614, the search personalization system 155 receives a set of search results. In some example embodiments, the search results are member profiles that represent potential customers for the first member In some example embodiments, the members are determined based on the criteria submitted with the search request In some example embodiments, the search reports are ranked based on the similarity of the search results to the search query. For example, a machine-learning program may determine a similarity value between the search results and the search query and, based on this similarity value, generate a similarity score. In this example, the similarity score is used as an additional feature in the ranking model.

At operation 616, the search results are converted to candidate search results that each have one or more candidate attribute vectors. In some example embodiments, the system calculates the candidate attribute vectors by extracting candidate attribute values from the search results and mapping the attribute values on the social data map in a similar fashion as shown above. Thus, the candidate search results comprise multiple attribute vectors (or, in some embodiments, a multi-dimensional attribute vector) from the social data map In some example embodiments, generating a candidate search result includes using information and attributes in the member profile as inputs to a model, and the model outputting a vector that represents the features of the member profile as a multi-dimensional vector.

At operation 618, for each candidate search result in the ranked list of search results, the search personalization system 155 generates a similarity score for the particular search result. In some example embodiments, comparing the particular search result with the model search result to generate a similarity score for the candidate search result comprises the social networking system (e.g., the social networking system 120 in FIG. 1) generating an attribute vector for the candidate search result (e.g., candidate member profile). In some example embodiments, the similarity score is determined by a machine-learning program.

In some example embodiments, the social networking system (e.g., the social networking system 120 in FIG. 1) uses a cosine similarity function to create a similarity score for the model search result (and its associated attribute vector) and the search result (and its associated attribute vector). In some example embodiments, the similarity score is between −1 to 1.

At operation 620, the search personalization system 155 uses the similarity score for each candidate search result to re-rank the search results, at least partially by their respective similarity scores. In this way, search results (e.g., member profiles) that more closely resemble the member's model search result are ranked higher than search results that do not, other things being equal. At operation 622, the re-ranked search results are transmitted to the client system 102 for presentation to the first member.

Figure 7:
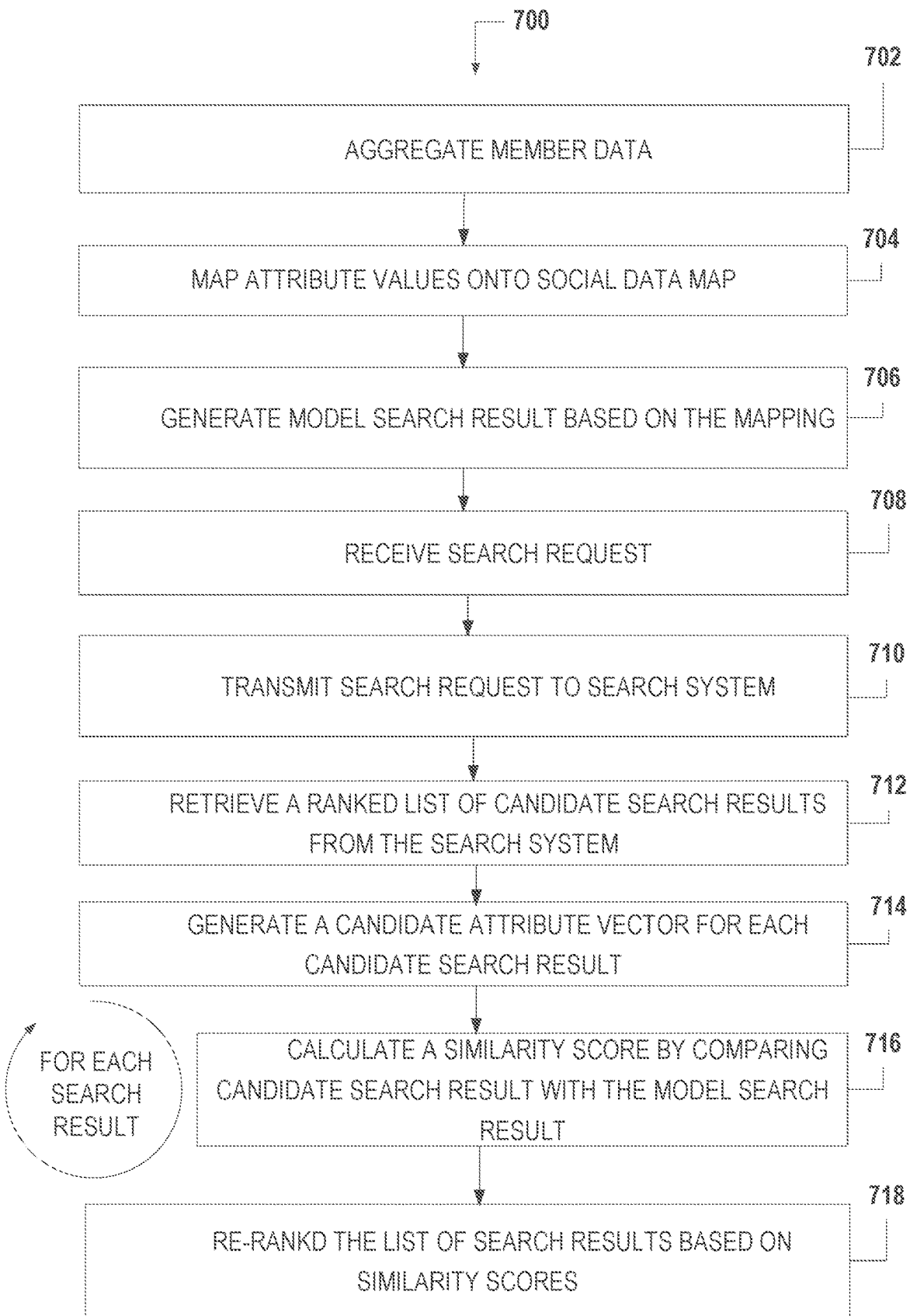
FIG. 7 is a flowchart of a method, according to some example embodiments, for personalizing search results based on member data for members of a social networking system.

FIG. 7 is a flowchart of a method 700, according to some example embodiments, for personalizing search results based on member data for members of a social networking system. While the various operations in this flowchart are presented and described sequentially, one of ordinary skill will appreciate that some or all of the operations may be executed in a different order, be combined or omitted, or be executed in parallel. Operation 702 is for aggregating member data about members on a social network where the member data includes attribute values that represent historical activity by the members of the social network and relationships between members. From operation 702, the method 700 flows to operation 704, where the system maps a first plurality of attribute values related to a first member onto a social data map where the social data map includes attribute vectors that are matchable to the attribute values. From operation 704, the method 700 flows to operation 706, where the system generates a model search result from the mapping of the first plurality of attribute values, with the model search result including model attribute vectors and representing a model search result for a first member. From operation 706, the method 700 flows to operation 708, where the system receives a search request for a first member. From operation 708, the method 700 then flows to operation 710 where the system transmits the search request to a search system. From operation 710, the method 700 then flows to operation 712, where the system retrieves a ranked list of candidate search results from the search system where the ranking is based on a relevance of the search results to the first member. From operation 712, the method then flows to operation 714, where the system generates a candidate attribute vector for each candidate search result. From operation 714, the method then flows to operation 716, where the system calculates a candidate attribute vector for each candidate search result. Finally, the method 700 flows to operation 718, where the system re-ranks the list of search results based on similarity scores between the candidate search results and the model search result.

Software Architecture

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

Figure 8:
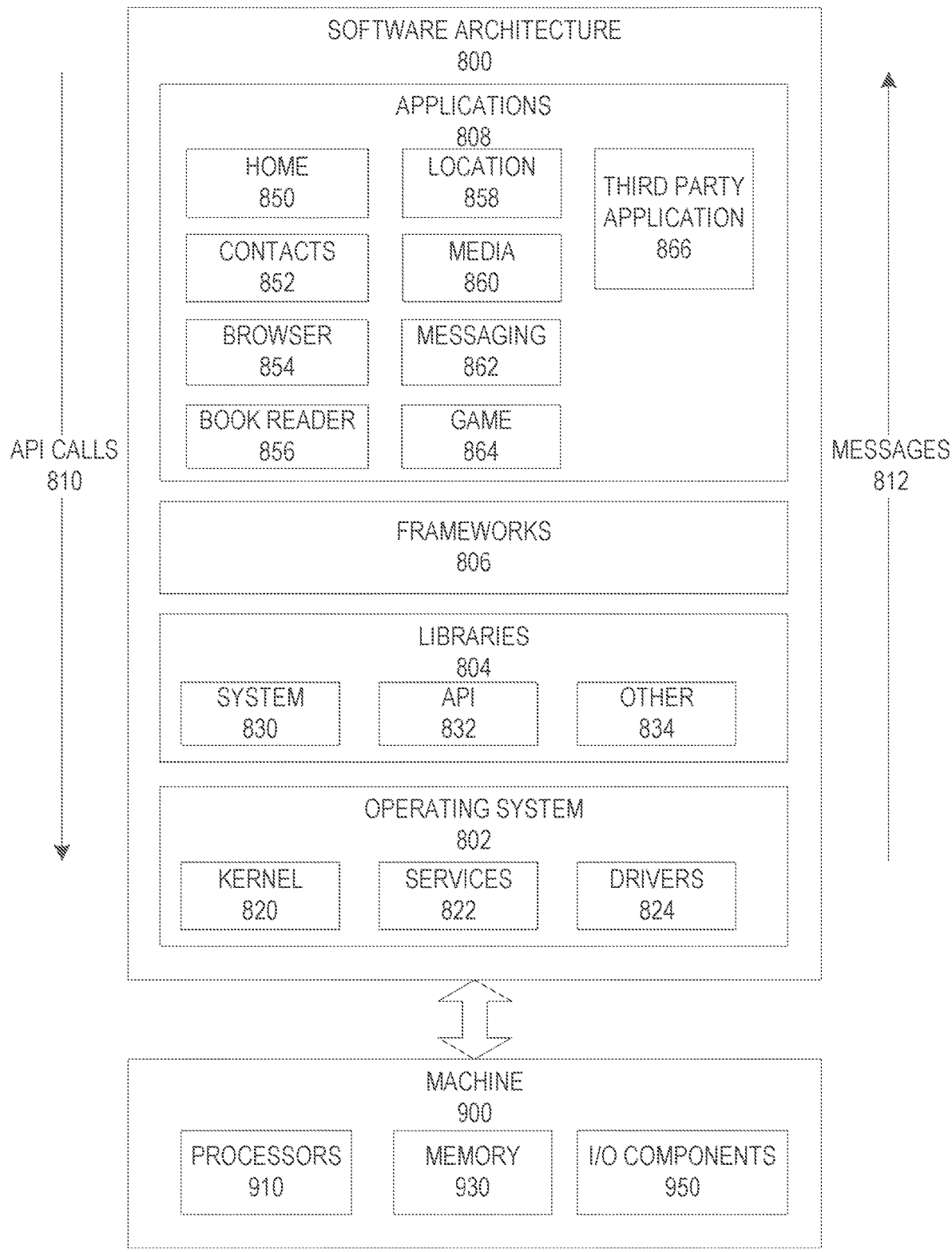
FIG. 8 is a block diagram illustrating an architecture of software, which may be installed on any of one or more devices, in accordance with some example embodiments.

FIG. 8 is a block diagram illustrating an software architecture 800, which may be installed on any one or more of the devices of FIG. 1. FIG. 8 is merely a non-limiting example of an software architecture 800 and it will be appreciated that many other architectures may be implemented to facilitate the functionality described herein. The software 800 may be executing on hardware such as a machine 900 of FIG. 9 that includes processors 910, memory 930, and input/output (I/O) components 950. In the example architecture of FIG. 8, the software 800 may be conceptualized as a stack of layers where each layer may provide particular functionality. For example, the software 800 may include layers such as an operating system 802, libraries 804, frameworks 806, and applications 808. Operationally, the applications 808 may invoke API calls 810 through the software stack and receive messages 812 in response to the API calls 810.

The operating system 802 may manage hardware resources and provide common services. The operating system 802 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 may be responsible for controlling and/or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 804 may provide a low-level common infrastructure that may be utilized by the applications 808. The libraries 804 may include system libraries 830 (e.g., C standard library) that may provide functions such as memory allocation functions, string manipulation functions, mathematic functions, and the like. In addition, the libraries 804 may include API libraries 832 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g, SQLite that may provide various relational database functions), web libraries (e.g., WebKit that may provide web browsing functionality), and the like. The libraries 804 may also include a wide variety of other libraries 834 to provide many other APIs to the applications 808.

The frameworks 806 may provide a high-level common infrastructure that may be utilized by the applications 808. For example, the frameworks 806 may provide various graphical user interface (GUI) functions, high-level resource management, high-level location services, and so forth. The frameworks 806 may provide a broad spectrum of other APIs that may be utilized by the applications 808, some of which may be specific to a particular operating system 802 or platform.

The applications 808 include a home application 850, a contacts application 852, a browser application 854, a book reader application 856, a location application 858, a media application 860, a messaging application 862, a game application 864, and a broad assortment of other applications, such as a third-party application 866. In a specific example, the third-party application 866 (e.g., an application developed using the Android™ or iOS™ software development kit (SDK) by an entity other than the vendor of the particular platform) may be mobile software running on a mobile operating system such as iOS™, Android™, Windows-@ Phone, or other mobile operating systems. In this example, the third-party application 866 may invoke the API calls 810 provided by the mobile operating system, such as the operating system 802, to facilitate functionality described herein.

Example Machine Architecture and Machine-Readable Medium

Figure 9:
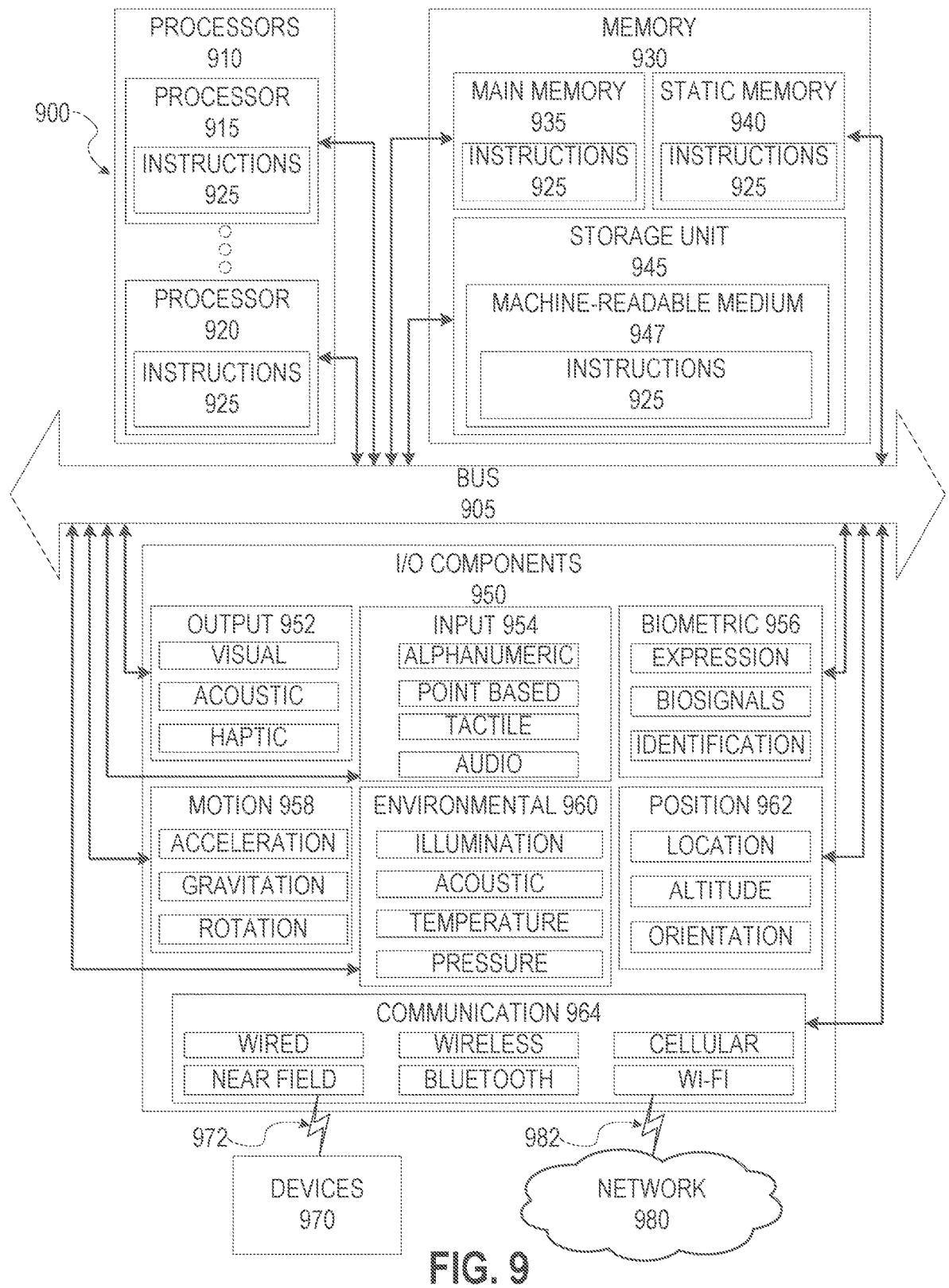
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 925 (e.g., software 800, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but be not limited to, a server computer, a client computer, a PC, a tablet computer; a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 925, sequentially or otherwise, that specify actions to be taken by the machine 900. Further, while only a single machine 900 is illustrated, the term "machine" shall also be taken to include a collection of machines 900 that individually or jointly execute the instructions 925 to perform any one or more of the methodologies discussed herein.

The machine 900 may include processors 910, memory 930, and I/O components 950, which may be configured to communicate with each other via a bus 905. In an example embodiment, the processors 910 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 915 and a processor 920, which may execute the instructions 925. The term "processor" is intended to include multi-core processors 910 that may comprise two or more independent processors 915, 920 (also referred to as "cores") that may execute the instructions 925 contemporaneously. Although FIG. 9 shows multiple processors 910, the machine 900 may include a single processor 910 with a single core, a single processor 910 with multiple cores (e.g, a multi-core processor), multiple processors 910 with a single core, multiple processors 910 with multiple cores, or any combination thereof.

The memory 930 may include a main memory 935, a static memory 940, and a storage unit 945 accessible to the processors 910 via the bus 905. The storage unit 945 may include a machine-readable medium 947 on which are stored the instructions 925 embodying any one or more of the methodologies or functions described herein. The instructions 925 may also reside, completely or at least partially, within the main memory 935, within the static memory 940, within at least one of the processors 910 (e.g., within the processor's cache memory), or any suitable combination thereof, during execution thereof by the machine 900. Accordingly, the main memory 935, the static memory 940, and the processors 910 may be considered machine-readable media 947.

As used herein, the term "memory" refers to a machine-readable medium 947 able to store data temporarily or permanently and may be taken to include, but not be limited to, random-access memory (RAM), read-only memory (ROM), buffer memory, flash memory, and cache memory. While the machine-readable medium 947 is shown, in an example embodiment, to be a single medium, the term "machine-readable medium" should be taken to include a single medium or multiple media (e.g., a centralized or distributed database, or associated caches and servers) able to store the instructions 925. The term "machine-readable medium" shall also be taken to include any medium, or combination of multiple media, that is capable of storing instructions (e.g., instructions 925) for execution by a machine (e.g., machine 900), such that the instructions 925, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 may include a wide variety of components to receive input, provide and/or produce output, transmit information, exchange information, capture measurements, and so on. It will be appreciated that the I/O components 950 may include many other components that are not shown in FIG. 9. In various example embodiments, the I/O components 950 may include output components 952 and/or input components 954. The output components 952 may include visual components (e.g, a display such as a plasma display panel (PDP), a light emitting diode (LED) display, a liquid crystal display (LCD), a projector, or a cathode ray tube (CRT)), acoustic components (e.g, speakers), haptic components (e.g., a vibratory motor), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, and/or other pointing instruments), tactile input components (e.g., a physical button, a touch screen that provides location and force of touches or touch gestures, and/or other tactile input components), audio input components (e.g., a microphone), and the like.

In further example embodiments, the I/O components 950 may include biometric components 956, motion components 958, environmental components 960, and/or position components 962, among a wide array of other components. For example, the biometric components 956 may include components to detect expressions (e.g, hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), acoustic sensor components (e.g., one or more microphones that detect background noise), temperature sensor components (e.g., one or more thermometers that detect ambient temperature), humidity sensor components, pressure sensor components (e.g., barometer), proximity sensor components (e.g., infrared sensors that detect nearby objects), and/or other components that may provide indications, measurements, and/or signals corresponding to a surrounding physical environment. The position components 962 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 and/or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine 900 and/or any of a wide variety of peripheral devices (e.g., a peripheral device coupled via a USB).

Moreover, the communication components 964 may detect identifiers and/or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar codes, multi-dimensional bar codes such as a Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In addition, a variety of information may be derived via the communication components 964, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT). Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 925 may be transmitted and/or received over the network 980 using a transmission medium via a network interface device (e.g., a network interface component included in the communication components 964) and utilizing any one of a number of well-known transfer protocols (e.g., HTTP). Similarly, the instructions 925 may be transmitted and/or received using a transmission medium via the coupling 972 (e.g., a peer-to-peer coupling) to the devices 970. The term "transmission medium" shall be taken to include any intangible medium that is capable of storing, encoding, or carrying the instructions 925 for execution by the machine 900, and includes digital or analog communications signals or other intangible media to facilitate communication of such software 900.

Furthermore, the machine-readable medium 947 is non-transitory (in other words, not having any transitory signals) in that it does not embody a propagating signal. However, labeling the machine-readable medium 947 as "non-transitory" should not be construed to mean that the medium is incapable of movement; the medium should be considered as being transportable from one physical location to another. Additionally, since the machine-readable medium 947 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A computer-implemented method using at least one computer processor, the method comprising:
   aggregating member data about members on a social network, the member data including attribute values that represent historical activity by the members of the social network and relationships between members;
   mapping a first plurality of attribute values related to a first member onto a social data map, the social data map including attribute vectors that are matchable to the attribute values;
   generating a model search result from the mapping of the first plurality of attribute values, the model search result including model attribute vectors and representing a model search result for the first member, wherein the model search result is a hypothetical search result that best matches first plurality of attribute values;
   receiving, from a client system, a search request from the first member;
   transmitting the search request to a search system;
   retrieving a ranked list of candidate search results from the search system, the ranking based on a relevance of the search results to the search request;
   generating a candidate attribute vector for each candidate search result;
   re-ranking the list of search results based on similarity scores between the candidate search results and the model search result; and
   sending the re-ranked search results to the client system for display.

2. The method of claim 1, wherein the ranked list of candidate search results is a ranked list of member profiles representing prospective members for the first member to contact.

3. The method of claim 1, further comprising:
   comparing the attribute values to a threshold attribute value, wherein only attribute values that exceed the threshold attribute value are included in the model member profile.

4. The method of claim 1, wherein the member data includes customer relation data that comprises information about historical transactions between members on the social network.

5. The method of claim 1, wherein the member data includes profile data that comprises data added to member profiles by the members; such as by inputting data or uploading data.

6. The method of claim 1, wherein the member data includes interactions between members on the social network such as interactions between the first member and other members.

7. The method of claim 6, wherein interactions with other members of the social networking system include the first member saving a member profile of another member of the social networking system.

8. The method of claim 6, wherein interactions between members on the social network include the first member sending or receiving a communication from another member of the social networking system.

9. The method of claim 6, wherein interactions with other members of the social networking system include the first member making a sales connection with another member of the social networking system.

10. The method of claim 1, wherein a similarity score is calculated based on a similarity value between the model search result and a candidate search result, the similarity value determined by a machine-learning program.

11. A system comprising
    at least one processor of a machine; and
    a memory storing instructions that, when executed by the at least one processor, cause the machine to perform operations comprising:
    aggregating member data about members on a social network, the member data including attribute values that represent historical activity by the members of the social network and relationships between members;
    mapping a first plurality of attribute values related to a first member onto a social data map, the social data map including attribute vectors that are matchable to the attribute values;
    generating a model search result from the mapping of the first plurality of attribute values, the model search result including model attribute vectors and representing a model search result for the first member, wherein the model search result is a hypothetical search result that best matches first plurality of attribute values;
    receiving, from a client system, a search request from the first member;
    transmitting the search request to a search system;
    retrieving a ranked list of candidate search results from the search system, the ranking based on a relevance of the search results to the search request;
    generating a candidate attribute vector for each candidate search result;
    re-ranking the list of search results based on similarity scores between the candidate search results and the model search result; and sending the re-ranked search results to the client system for display.

12. The system of claim 11, wherein the ranked list of candidate search results is a ranked list of member profiles representing prospective members for the first member to contact.

13. The system of claim 11, wherein operations further comprise:
comparing the attribute values to a threshold attribute value, wherein only attribute values that exceed the threshold attribute value are included in the model member profile.

14. The system of claim 11, wherein the member data includes customer relation data that comprises information about historical transactions between members on the social network.

15. The system of claim 11, wherein the member data includes profile data that comprises data added to member profiles by the members, such as by inputting data or uploading data.

16. The system of claim 11, wherein the member data includes interactions between members on the social network such as interactions between the first member and other members.

17. The system of claim 16, wherein interactions with other members of the social networking system include the first member saving a member profile of another member of the social networking system.

18. The system of claim 16, wherein interactions between members on the social network include the first member sending or receiving a communication from another member of the social networking system.

19. The system of claim 11, wherein a similarity score is calculated based on a similarity value between the model search result and a candidate search result, the similarity value determined by a machine-learning program.

20. A non-transitory machine-readable storage medium comprising instructions that, when executed by one or more processors of a machine; cause the machine to perform operations comprising:
aggregating member data about members on a social network, the member data including attribute values that represent historical activity by the members of the social network and relationships between members;
mapping a first plurality of attribute values related to a first member onto a social data map, the social data map including attribute vectors that are matchable to the attribute values;
generating a model search result from the mapping of the first plurality of attribute values, the model search result including model attribute vectors and representing a model search result for the first member, wherein the model search result is a hypothetical search result that best matches first plurality of attribute values;
receiving, from a client system, a search request from the first member;
transmitting the search request to a search system;
retrieving a ranked list of candidate search results from the search system, the ranking based on a relevance of the search results to the search request;
generating a candidate attribute vector for each candidate search result;
re-ranking the list of search results based on similarity scores between the candidate search results and the model search result; and
sending the re-ranked search results to the client system for display.

* * * * *